(12) United States Patent
Yu et al.

(10) Patent No.: US 11,674,023 B2
(45) Date of Patent: Jun. 13, 2023

(54) POLYMER COMPOSITION AND METHODS OF MAKING AND USING SAME

(71) Applicant: Chevron Phillips Chemical Company LP, The Woodlands, TX (US)

(72) Inventors: Youlu Yu, Bartlesville, OK (US); Eric D. Schwerdtfeger, Bartlesville, OK (US); Jeffrey S. Fodor, Bartlesville, OK (US); David A. Soules, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 308 days.

(21) Appl. No.: 17/071,616

(22) Filed: Oct. 15, 2020

(65) Prior Publication Data

US 2022/0119627 A1 Apr. 21, 2022

(51) Int. Cl.
  *C08L 23/08* (2006.01)
(52) U.S. Cl.
  CPC .............................. *C08L 23/0815* (2013.01)
(58) Field of Classification Search
  CPC .. C08L 23/06; C08L 23/0815; C08L 2314/04; C08F 210/16
  See application file for complete search history.

(56) References Cited

U.S. PATENT DOCUMENTS

| | | |
|---|---|---|
| 3,119,569 A | 1/1964 | Baricordi |
| 3,248,179 A | 4/1966 | Norwood |
| 3,887,494 A | 6/1975 | Dietz |
| 3,900,457 A | 8/1975 | Witt |
| 4,053,436 A | 10/1977 | Hogan |
| 4,081,407 A | 3/1978 | Short |
| 4,151,122 A | 4/1979 | McDaniel |
| 4,152,503 A | 5/1979 | Short |

(Continued)

FOREIGN PATENT DOCUMENTS

| | | | |
|---|---|---|---|
| EP | 1185608 A1 | 3/2002 | |
| WO | 2001000690 A2 | 1/2001 | |
| WO | WO-2019096745 A1 * | 5/2019 | ........... B29C 43/003 |

OTHER PUBLICATIONS

Nairn "Polymer Structure and Characterization" 2007 (herein Nairn) (Year: 2007).*

(Continued)

*Primary Examiner* — Mark S Kaucher
(74) *Attorney, Agent, or Firm* — Conley Rose, P.C.

(57) ABSTRACT

A bimodal polymer composition comprising a lower molecular weight homopolymer and a higher molecular weight copolymer wherein the bimodal polymer composition has a density of from about 0.930 gram per cubic centimeter (g/cc) to about 0.970 g/cc, a ratio of high load melt index:melt index of from about 10 to about 150 and an Environmental Stress Crack Resistance (ESCR) of from about 25 hours to about 300 hours when measured in accordance with ASTM D1693 or ASTM D2561. A chromium-catalyzed polymer composition comprising (i) a lower molecular weight homopolymer and (ii) a higher molecular weight copolymer, wherein the bimodal polymer composition has an Environmental Stress Crack Resistance (ESCR) of from about 25 hours to about 300 hours when measured in accordance with ASTM D1693 or ASTM D2561.

22 Claims, 3 Drawing Sheets

(56) References Cited

U.S. PATENT DOCUMENTS

| | | |
|---|---|---|
| 4,177,162 A | 12/1979 | McDaniel |
| 4,247,421 A | 1/1981 | McDaniel |
| 4,248,735 A | 2/1981 | McDaniel |
| 4,277,587 A | 7/1981 | McDaniel |
| 4,294,724 A | 10/1981 | McDaniel |
| 4,364,842 A | 12/1982 | McDaniel |
| 4,364,855 A | 12/1982 | McDaniel |
| 4,382,022 A | 5/1983 | McDaniel |
| 4,444,965 A | 4/1984 | McDaniels |
| 4,501,885 A | 2/1985 | Sherk |
| 4,504,638 A | 3/1985 | McDaniel |
| 4,588,790 A | 5/1986 | Jenkins, III |
| 4,735,931 A | 4/1988 | McDaniel |
| 4,820,785 A | 4/1989 | McDaniel |
| 4,966,951 A | 10/1990 | Benham |
| 4,981,831 A | 1/1991 | Knudsen |
| 5,306,775 A * | 4/1994 | Martin ............... C08L 23/04 525/240 |
| 5,352,749 A | 10/1994 | Dechellis |
| 5,436,304 A | 7/1995 | Griffin |
| 5,565,175 A | 10/1996 | Hottovy |
| 5,575,979 A | 11/1996 | Hanson |
| 5,648,439 A | 7/1997 | Bergmeister |
| 6,063,878 A * | 5/2000 | Debras ............... C08F 10/02 526/64 |
| 6,239,235 B1 | 5/2001 | Hottovy |
| 6,262,191 B1 | 7/2001 | Hottovy |
| 6,833,415 B2 | 12/2004 | Kendrick |
| 7,271,122 B2 | 9/2007 | Bodart |
| 2007/0213205 A1* | 9/2007 | Mihan ............... C08F 210/02 525/240 |
| 2010/0113851 A1 | 5/2010 | Kreischer |
| 2011/0201768 A1 | 8/2011 | Benham |
| 2011/0288247 A1 | 11/2011 | Hottovy |
| 2012/0022214 A1* | 1/2012 | Davis ............... C08L 23/0815 525/53 |
| 2012/0041147 A1* | 2/2012 | Lacombe ............... C08F 10/00 525/240 |
| 2015/0191554 A1* | 7/2015 | McDaniel ............... C08F 10/02 526/348 |
| 2015/0259444 A1* | 9/2015 | Rohatgi ............... C08F 10/14 526/348.5 |
| 2020/0385554 A1* | 12/2020 | Ribour ............... C08F 210/16 |

OTHER PUBLICATIONS

Andrew Peacock, Handbook of Polyethylene (Year: 2000).*
International Search Report and Written Opinion issued in corresponding PCT Application No. PCT/US2021/071783, dated Feb. 23, 2022, 12 pp.
Cicmil Dimitrije et al, "Polyethylene with Reverse Co-monomer Incorporation: From an Industrial. Serendipitous Discovery to Fundamental. Understanding", Angewandte Chemie International Edition, vol. 54, No. 44, Sep. 9, 2015 (Sep. 9, 2015), pp. 13073-13079, XP055887557, ISSN: 1433-7851, DOI: 10.1002/anie.201506718 Retrieved from the Internet: URL:https://onl.inel.ibrary.wil.ey.com/doi/fu l.l.-xml./10.1002/anie.201506718>.
DesLauriers, et al., "Estimating Slow Crack Growth Performance of Polyethylene Resins from Primary Structures such as Molecular Weight and Short Chain Branching," Macromolecular Symposia, 282, 2009, pp. 136-149.
IUPAC Compendium of Chemical Terminology, 2nd Ed. 1997, pp. 1-1670.
L. Kurelec, et al., "Strain hardening modulus as a measure of environmental stress crack resistance of high density polyethylene," Elsevier, Science Direct, Polymer, 46, 2005, pp. 6369-6379.
Rudy A.C. Deblieck, et al, "Failure Mechanisms in Polyolefins: The Role of Crazing, Shear Yielding, and the Entanglement Network," Elsevier, Science Direct, Polymer, 52, 2011, pp. 2979-2990.
Youlu Yu, "A Short-Chain Branching Distribution Determination Technique for Polyethylene Using IR5-Detected GPC," Macromolecular Symposia, 2020, 390, 1900014, pp. 1-10.

* cited by examiner

POLYMER COMPOSITION AND METHODS OF MAKING AND USING SAME

TECHNICAL FIELD

The present disclosure relates to a polymer composition with improved mechanical properties such as Environmental Stress Crack Resistance (ESCR).

BACKGROUND

Polymeric compositions, such as polyethylene compositions, are used for the production of a wide variety of articles. Often, these articles are exposed to numerous stresses during their lifetime, and that exposure may result in cracks or breaks that adversely affect the utility of the article. Thus, there is an ongoing need for polymer compositions displaying a high level of resistance to the development of cracks or breaks to extend their application utility.

SUMMARY

Disclosed herein is a bimodal polymer composition comprising a lower molecular weight homopolymer and a higher molecular weight copolymer wherein the bimodal polymer composition has a density of from about 0.930 gram per cubic centimeter (g/cc) to about 0.970 g/cc, a ratio of high load melt index:melt index of from about 10 to about 150 and an Environmental Stress Crack Resistance (ESCR) of from about 25 hours to about 300 hours when measured in accordance with ASTM D1693 or ASTM D2561.

Also disclosed herein is a chromium-catalyzed polymer composition comprising (i) a lower molecular weight homopolymer and (ii) a higher molecular weight copolymer, wherein the bimodal polymer composition has an Environmental Stress Crack Resistance (ESCR) of from about 25 hours to about 300 hours when measured in accordance with ASTM D1693 or ASTM D2561.

BRIEF DESCRIPTION OF THE DRAWINGS

The following figures form part of the present specification and are included to further demonstrate certain aspects of the present disclosure. The present disclosure may be better understood by reference to one or more of these figures in combination with the detailed description of specific aspects presented herein.

Figure 1:
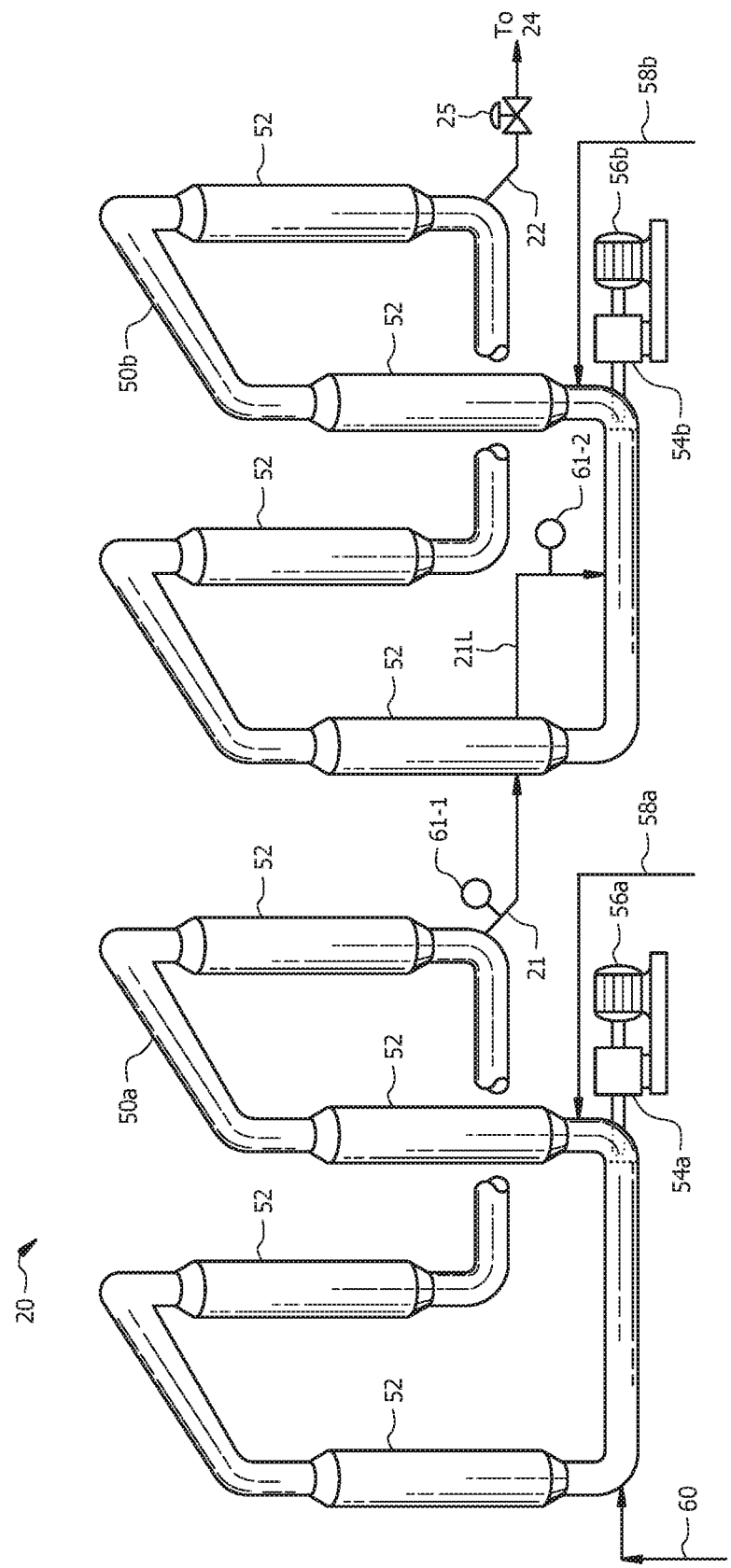
FIG. 1 is a process flow diagram of an exemplary polymerization reactor system in accordance with some aspects of the present disclosure.

While the subject matter disclosed herein is susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the disclosed subject matter.

DETAILED DESCRIPTION

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed. (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

The terms "a," "an," "the," etc., are intended to include plural alternatives, e.g., at least one, unless otherwise specified. For instance, the disclosure of "a higher molecular weight component" is meant to encompass one, or mixtures or combinations of more than one, higher molecular weight component, respectively, unless otherwise specified.

The term "polymer" is used herein generically to include homopolymers, copolymers, terpolymers, and so forth. A copolymer is derived from a monomer and a comonomer, while a terpolymer is derived from a monomer and two comonomers. Accordingly, "polymer" encompasses homopolymers, copolymers, terpolymers, etc., derived from any monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as an ethylene/1-hexene copolymer.

In like manner, the scope of the term "polymerization" includes homopolymerization, copolymerization, terpolymerization, etc. Therefore, a copolymerization process can involve contacting one monomer (e.g., ethylene) and one comonomer (e.g., 1-hexene) to produce a copolymer.

Aspects disclosed herein the may provide the materials listed as suitable for satisfying a particular feature of the aspect delimited by the term "or." For example, a particular feature of the disclosed subject matter may be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

The terms "configured to", "configured for use", "adapted for use", and similar language is used herein to reflect that the particular recited structure or procedure is used in a polymerization system or process. For example, unless otherwise specified, a particular structure "configured for use" means it is "configured for use in a polymerization reactor system" and therefore is designed, shaped, arranged, constructed, and/or tailored to effect a polymerization, as would have been understood by the skilled person.

The terms "conduit" and "line" are interchangeable, and as used herein, refer to a physical structure configured for the flow of materials there through, such as pipe or tubing.

The materials that flow in the "conduit" or "line" can be in a gas phase, a liquid phase, a solid phase, or a combination of these phases.

The term "stream" as used herein refers to a physical composition of materials that flow through a "conduit" or "line."

Disclosed herein is a polymer composition with improved mechanical properties such as Environmental Stress Crack Resistance (ESCR). In one or more aspects, the polymers disclosed herein are chromium-catalyzed multimodal polymers. Such polymer compositions are herein referred to as Improved Mechanical properties Polymers or IMPs. Without being limited by theory, an Improved Mechanical properties Polymer (IMP) may display improved mechanical properties as a result of placing all or most of short chain branches (SCB) in a higher molecular weight (HMW) component of the IMP, while placing no or fewer SCB in a lower molecular weight (LMW) component of the IMP. Also disclosed herein are methods of making and using the IMP, such as using an advanced dual loop (ADL) reactor system under suitable conditions and blow molding the IMP into blow molded articles.

In aspects, an IMP comprises a multimodal IMP, alternatively a chromium-catalyzed multimodal IMP. Herein, the "modality" of an IMP refers to the form of its MWD curve, i.e., the appearance of the graph of the polymer weight fraction as a function of its molecular weight. The polymer weight fraction refers to the weight fraction of molecules of a given size. The term "multimodal polymer" herein refers to polymers having molecular weight distribution (MWD) curves showing more than one peak. Unless otherwise indicated herein, references to an IMP is understood to include a multimodal IMP, including but not limited to an IMP having a higher molecular weight (HMW) component and a lower molecular weight (LMW) component. In an aspect, the IMP is a bimodal chromium-catalyzed polymer comprising, consisting of, or consisting essentially of a HMW component and a LMW component.

An IMP of the present disclosure may have two or more distinguishable components, for example based upon their individual composition and/or MWD. The MWD curves for the individual components may be superimposed onto a common chart to form the MWD curve for the IMP as a whole. Upon such superimposition, the resultant curve for the IMP as a whole may be multimodal or show distinct peaks corresponding to polymer components of differing MWDs. For example, a bimodal IMP may show two distinct peaks corresponding to two individual components. In such an example, a bimodal IMP may have a first component that may be generally characterized as a HMW polymer component and a second component that may be generally characterized as a LMW polymer component. A trimodal IMP may show three distinct peaks corresponding to three individual polymer components.

In an alternative aspect, superimposition of the MWD curves from the individual components in an IMP may show a single peak that is broadened in comparison with the curves for the individual components. In such aspects, the broadened single peak corresponds to polymer fractions of the IMP having different but overlapping MWDs. Such compositions while appearing unimodal in fact may be deconvoluted into their individual component peaks and can thus be shown to be a multimodal composition.

In an aspect, the IMP comprises a HMW component and a LMW component. In an aspect, an IMP comprises a HMW component which is a copolymer (also referred to as a HMW copolymer, e.g., a copolymer of ethylene and 1-hexene) and a LMW component which is a homopolymer (also referred to as a LMW homopolymer, e.g., a homopolymer of ethylene).

In an aspect, the LMW component is a homopolymer. The LMW component may be formed from 1-olefin monomers having up to 10 carbon atoms per molecule and typically no branching nearer the double bond than the 4-position. Examples of monomers suitable for use in the production of the LMW component include, but are not limited to ethylene, propylene, butene, 1-pentene, 1-hexene, 1-octene, and 1-decene. In an aspect, the monomer is ethylene and the LMW component is polyethylene homopolymer.

In an aspect, the HMW component is a copolymer of ethylene and a comonomer. The comonomer can comprise unsaturated hydrocarbons with 3 to 12 carbon atoms, alternatively with 3 to 10 carbon atoms, or alternatively with 3 to 8 carbon atoms. In an aspect, the comonomer comprises an alkene or derivative thereof; alternatively an $\alpha$-alkene or derivative thereof. For example, a comonomer suitable for use in the present disclosure may comprise propylene, 1-butene, 1-pentene, 1-hexene, 3-methyl-1-butene, 4-methyl-1-pentene, 1-heptene, 1-octene, 1-nonene, 1-decene, 1-dodecene, or combinations thereof. In an aspect, the comonomer contains an even number of carbon atoms (e.g., 1-hexene, 1-octene). In an aspect, the comonomer comprises 1-hexene. In an aspect, the IMP is a chromium-catalyzed polyethylene bimodal polymer having a HMW component comprised of an ethylene/1-hexene copolymer and a LMW component comprised of a polyethylene homopolymer.

It is to be understood that in the case where the IMP comprises polymer blends (e.g., reactor blends) the individual components of the blend are described approximately herein. Thus, any metrics or characteristics provided herein for the individual components of a polymer blend are approximated for that portion of the material corresponding to the designated component and are provided as values for some portion of the material within the larger context of the entire blend. Thus, where it is not practical to measure the characteristics of an individual component (e.g., reactor blend) such characteristics when represented herein may contain some contribution from other components of the blend.

A weight ratio of the LMW component (e.g., a LMW homopolymer) to the HMW component (e.g., a BMW copolymer) present in the IMP can be from about 35:65 to about 65:35, alternatively from about 40:60 to about 60:40, or alternatively from about 45:55 to about 55:45. In an aspect, the LMW component (e.g., a LMW homopolymer) is present in the IMP in an amount of from about 35 wt. % to about 65 wt. %, alternatively from about 40 wt. % to about 60 wt. % or alternatively from about 45 wt. % to about 55 wt. % based on a total weight of the IMP, and the HMW component (e.g., a BMW copolymer) makes up the balance of the IMP.

In an aspect, the LMW component (e.g., a LMW homopolymer) of the IMP has a weight average molecular weight ($M_w$) of from about 50,000 g/mol to about 250,000 g/mol, alternatively from about 75,000 g/mol to about 225,000 g/mol, or alternatively from about 100,000 g/mol to about 200,000 g/mol. The $M_w$ describes the weight-average molecular weight of a polymer and can be calculated according to Equation 1:

$$M_w = \frac{\sum_i N_i M_i^2}{\sum_i N_i M_i} \quad (1)$$

wherein $N_i$ is the number of molecules of molecular weight $M_i$. All molecular weight averages are expressed in gram per mole (g/mol).

In an aspect, the LMW component (e.g., a LMW homopolymer) of the IMP has a number average molecular weight ($M_n$) of from about 5,000 g/mol to about 200,000 g/mol, alternatively from about 10,000 g/mol to about 150,000 g/mol, or alternatively from about 15,000 g/mol to about 100,000 g/mol. The $M_n$ is the number-average molecular weight of the individual polymers and was calculated by measuring the molecular weight $M_i$ of $N_i$ polymer molecules, summing the weights, and dividing by the total number of polymer molecules, according to equation 2:

$$M_n = \frac{\sum_i N_i M_i}{\sum_i N_i} \quad (2)$$

wherein $N_i$ is the number of molecules of molecular weight $M_i$.

In an aspect, the LMW component (e.g., a LMW homopolymer) of the IMP has a z-average molecular weight ($M_z$) of from about 200,000 g/mol to about 2,500,000 g/mol, alternatively from about 350,000 g/mol to about 2,000,000 g/mol, or alternatively from about 500,000 g/mol to about 2,000,000 g/mol. The $M_z$ is a higher order molecular weight average which was calculated according to equation 3:

$$M_z = \frac{\sum_i N_i M_i^3}{\sum_i N_i M_i^2} \quad (3)$$

wherein $N_i$ is the number of molecules of molecular weight $M_i$.

In an aspect, the LMW component (e.g., a LMW homopolymer) has a peak molecular weight ($M_p$) ranging from about 10,000 kg/mol to about 200,000 kg/mol, alternatively from about 20,000 kg/mol to about 17,500 kg/mol, or alternatively from about 40,000 kg/mol to about 150,000 kg/mol. The $M_p$ is defined as the molecular weight of the highest peak, wherein the molecular weight is measured by size exclusion chromatography (SEC) or a similar method.

In an aspect, the ratio of the $M_w$ of the HMW component to the $M_w$ of the LMW component is from greater than about 1 to about 7, alternatively from about 1.25 to about 7 or alternatively from about 1.5 to about 2.0. In an aspect, the ratio of the Mp of the HMW component to the Mp of the LMW component is from greater than about 1 to about 40, alternatively from about 1.5 to about 10 or alternatively from about 2.0 to about 3.0.

In an aspect, a number of short chain branches (SCB) present in the LMW component (e.g., a LMW homopolymer) is from about 0 per 1000 total carbon atoms to less than about 2 per 1000 total carbon atoms, alternatively from about 0 per 1000 total carbon atoms to about 1 per 1000 total carbon atoms, or alternatively from about 0 per 1000 total carbon atoms to about 0.2 per total 1000 carbon atoms. In an aspect, a number of short chain branches (SCB) present in the LMW component (e.g., a LMW homopolymer) is from greater than about 0 per 1000 total carbon atoms to about 2 per 1000 total carbon atoms, alternatively from greater than about 0 per 1000 total carbon atoms to about 1 per 1000 total carbon atoms, or alternatively from greater than about 0 per 1000 total carbon atoms to about 0.2 per 1000 total carbon atoms.

Without being limited by theory, short chain branches or branching (SCB) can be due to copolymer distribution. SCB Distribution (SCBD) provides a number of SCB per 1000 carbon atoms at each molecular weight (MW) across a MWD profile of a polymer. The SCB and SCBD of a polymer can be provided by any suitable method and instrumentation including, but not limited to, NMR, or GPC-IR5 (as described in Y. Yu, A Short-Chain Branching Distribution Determination Technique for Polyethylene Using IR5-Detected GPC, *Macromolecular Symposia*, 2020, 390, 1900014). As used in this disclosure, the SCBD of a polymer refers to the number of SCB per 1000 carbon atoms at each MW across the MWD profile.

In an aspect, the HMW component (e.g., a BMW copolymer) of the IMP has a $M_w$ of from about 135,000 g/mol to about 350,000 g/mol, alternatively from about 150,000 g/mol to about 300,000 g/mol, or alternatively from about 175,000 g/mol to about 250,000 g/mol. In an aspect, the BMW component (e.g., a HMW copolymer) of the IMP has a $M_n$ of from about 12,500 g/mol to about 125,000 g/mol, alternatively from about 17,500 g/mol to about 100,000 g/mol, or alternatively from about 22,500 g/mol to about 35,000 g/mol. In an aspect, the HMW component (e.g., a HMW copolymer) of the IMP has a $M_z$ of from about 500,000 g/mol to about 5,000,000 g/mol, alternatively from about 750,000 g/mol to about 3,250,000 g/mol, or alternatively from about 1,000,000 g/mol to about 2,000,000 g/mol.

In an aspect, the HMW component (e.g., a BMW copolymer) has an $M_p$ ranging from about 75,000 kg/mol to about 400,000 kg/mol, alternatively from about 100,000 kg/mol to about 300,000 kg/mol, or alternatively from about 125,000 kg/mol to about 250,000 kg/mol.

In an aspect, a number of SCBs present in the HMW component (e.g., a HMW copolymer) is in a range of from about 0.5 per 1000 total carbon atoms to about 10 per 1000 total carbon atoms, alternatively from about 0.75 per 1000 total carbon atoms to about 7.5 per 1000 total carbon atoms, or alternatively from about 1.0 per 1000 total carbon atoms to about 5 per 1000 total carbon atoms.

In aspects, an IMP in the present disclosure has an improved ESCR. Environmental stress cracking refers to the premature initiation of cracking and embrittlement of a plastic due to the simultaneous action of stress, strain and contact with specific chemical environments. ESCR measures a polymer's resistance to this form of damage and can be determined using ASTM D1693, condition A and condition B, or ASTM D2561. ESCR values measured under condition A and condition B are referred to as ESCR-A and ESCR-B, respectively. ESCR values measured using ASTM D2561 is bottle ESCR, which is usually tested with 16-oz., 25-g., Boston Round bottles blow molded from a polymer, although a container of any size and shape can be used.

Without being limited by theory, a polymer that has a high amount of SCB at the high molecular weight region will have higher probability to form tie chains so that their long-term mechanical properties such as ESCR can be improved.

In an aspect, the IMP has ESCR-A of from about 25 hours to about 4,500 hours, alternatively from about 25 hours to about 2,000 hours or alternatively from about 35 hours to about 1,000 hours, when measured in accordance with ASTM D1693.

Therefore the IMP can have ESCR (including both ESCR-A, ESCR-B, and bottle ESCR) of from about 25 hours to about 300 hours, alternatively from about 25 hours to about 250 hours or alternatively from about 35 hours to about 300 hours when measured in accordance with ASTM D1693. In one or more aspects, the IMP can have ESCR (including both ESCR-A, ESCR-B, and bottle ESCR) of from about 25 hours to about 300 hours, alternatively from about 25 hours to about 250 hours or alternatively from about 35 hours to about 300 hours when measured in accordance with ASTM D2561. Marlex® HEIM 5502BN high density polyethylene is commercially available from Chevron Phillips Chemical Company LP and is used as a baseline for ESCR in the present disclosure. ESCR values of the Marlex® HEIM 5502BN high density polyethylene are listed in Table 1 in Example 1.

In an aspect, the IMP has a density of from about 0.930 gram per cubic centimeter (g/cc) to about 0.970 g/cc, alternatively from about 0.938 g/cc to about 0.965 g/cc, or alternatively from about 0.942 g/cc to about 0.962 g/cc, when measured in accordance with ASTM D1505.

In an aspect, the IMP has a Melt Index (MI) of from about 0.01 grams per 10 minutes (g/10 min) to about 1.0 g/10 min, alternatively from about 0.05 g/10 min to about 0.8 g/10 min, or alternatively from about 0.1 g/10 min to about 0.6 g/10 min. The MI represents the rate of flow of a molten polymer through an orifice of 0.0825 inch diameter when subjected to a force of 2,160 grams at 190° C. as determined in accordance with ASTM D1238-82 condition E.

In an aspect, the IMP has a High Load Melt Index (HLMI) of from about 1 g/10 min to about 100 g/10 min, alternatively from about 2 g/10 min to about 50 g/10 min, alternatively from about 4 g/10 min to about 25 g/10 min or alternatively from about 5 g/10 min to about 17 g/10 min. The HLMI represents the rate of flow of a molten polymer through an orifice of 0.0825 inch diameter when subjected to a force of 21,600 grams at 190° C. as determined in accordance with ASTM D1238-82 condition F.

In an aspect, the IMP has HLMI/MI, also known as the shear response, of from about 10 to about 150, 10 to about 100, alternatively from about 20 to about 80, or alternatively from about 30 to about 60. The HLMI/MI ratio is a dimensionless number which gives an indication of breadth of MWD. As HLMI/MI increases, MWD broadens, the rheological distribution increases, or both.

In an aspect, the IMP has an I10 of from about 0.01 g/10 min to about 10 g/10 min, alternatively from about 0.2 g/10 min to about 0.7 g/10 min, or alternatively from about 0.5 g/10 min to about 5 g/10 min. The I10 represents the rate of flow of a molten polymer through an orifice of 0.0825 inch diameter when subjected to a force of 10,000 grams at 190° C. as determined in accordance with ASTM D1238-82 condition N.

In an aspect, the IMP has an $M_w$ of from about 100,000 g/mol to about 300,000 g/mol, alternatively from about 120,000 g/mol to about 300,000 g/mol, alternatively from about 140,000 g/mol to about 275,000 g/mol, alternatively from about 150,000 g/mol to about 250,000 g/mol, alternatively from about 125,000 g/mol to about 260,000 g/mol or alternatively from about 150,000 g/mol to about 225,000 g/mol.

In an aspect, the IMP has an $M_n$ of from about 10,000 g/mol to about 60,000 g/mol, alternatively from about 10,000 g/mol to about 50,000 g/mol, alternatively from about 15,000 g/mol to about 35,000 g/mol, alternatively from about 12,500 g/mol to about 40,000 g/mol, or alternatively from about 15,000 g/mol to about 25,000 g/mol.

In an aspect, the IMP has an $M_z$ of from about 650,000 g/mol to about 3,500,000 g/mol, alternatively from about 650,000 g/mol to about 2,500,000 g/mol, alternatively from about 750,000 g/mol to about 3,000,000 g/mol, alternatively from about 850,000 g/mol to about 2,20,000 g/mol alternatively from about 600,000 g/mol to about 2,250,000 g/mol, or alternatively from about 700,000 g/mol to about 2,000,000 g/mol.

The MWD can be calculated as a ratio of the $M_w$ to the $M_n$ ($M_w/M_n$), which can also be referred to as the polydispersity index (PDI) or more simply as polydispersity. In an aspect, the BMW component (e.g., a BMW copolymer) of the IMP may have a PDI of from about 4.5 to about 20, alternatively from about 5.5 to about 15, or alternatively from about 6 to about 10. The LMW component (e.g., a LMW homopolymer) of the IMP may have a PDI of from about 4.5 to about 20, alternatively from about 5.5 to about 15, or alternatively from about 6 to about 10. The resultant IMP (i.e., including both the LMW component and the BMW component) may have a PDI of from about 6 to about 30, alternatively from about 6 to about 25, alternatively from about 6 to about 20, alternatively 6 to about 15, alternatively from about 7 to about 15 or alternatively from about 7 to about 12.

In an aspect, the IMP has a ratio of the $M_z$ to the $M_w$ ($M_z/M_w$) of from about 500,000 to about 3,500,000 alternatively from about 750,000 to about 3,000,000, or alternatively from about 850,000 to about 2, 500,000.

In an aspect, the IMP has a primary structure parameter (PSP2) of from about 6 to about 13, alternatively from about 6.2 to about 11, or alternatively from about 6.5 to about 9.5. The PSP2 calculation as outlined by DesLauriers and Rohlfing in *Macromolecular Symposia* (2009), 282 (Polyolefin Characterization—ICPC 2008), pages 136-149 is incorporated by reference herein. In an aspect, the IMPS of the present disclosure are chromium-catalyzed bimodal polymers. In such aspect, the IMPS of the present disclosure may display a reduced hydrogen response.

In an aspect, an IMP of the present disclosure may be prepared by any suitable methodology, for example by employing one or more catalyst systems, in one or more reactors, in solution, in slurry, or in the gas phase, and/or by varying the monomer concentration in the polymerization reaction, and/or by changing any/all of the materials or parameters involved in the production of the IMP, as will be described in more detail later herein.

The IMP of the present disclosure can be produced using various types of polymerization reactors. As used herein, "polymerization reactor" includes any reactor capable of polymerizing olefin monomers to produce homopolymers and/or copolymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymers from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an aspect, any arrangement and/or any combination of reactors may be employed to produce the polymer of the present disclosure.

According to one aspect, the polymerization reactor system comprises at least one slurry loop reactor. Such reactors may comprise vertical or horizontal loops. Monomer, diluent, catalyst system, and optionally any comonomer may be continuously fed to a slurry loop reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for separation of the liquids comprising the diluent from the solid polymer, monomer and/or comonomer. Examples of suitable technologies for the separation include, but are not limited to, flashing that may include any combination of heat addition and pressure reduction; separation by cyclonic action in either a cyclone or hydrocyclone; separation by centrifugation; or other appropriate method of separation.

Suitable slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, n-hexane, cyclohexane, cyclopentane, methylcyclopentane, ethylcyclohexane, and the like. Some loop polymerization reactions can occur under bulk conditions where no diluent is used.

According to yet another aspect, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another aspect, a high pressure polymerization reactor may comprise a tubular reactor or an autoclave reactor. Tubular reactors may have several zones where fresh monomer, initiators, or catalysts are added. Monomers may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect, the polymerization reactor may comprise a solution polymerization reactor wherein the monomer is contacted with the catalyst composition by suitable stirring or other means. A carrier comprising a diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide properties include, but are not limited to temperature, pressure, type and quantity of catalyst or co-catalyst, and the concentrations of various reactants. Polymerization temperature (also referred to as reaction temperature herein) can affect catalyst productivity, polymer molecular weight and MWD. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain mechanical properties such as ESCR and physical properties such as density, molecular weight, MWD, SCB, and rheological measurements. Proper concentrations to obtain the desired properties of the IMPs are further described in detail later.

In an aspect, a method of preparing an IMP comprises contacting a monomer (e.g., ethylene) with a catalyst system under conditions suitable for the formation of the IMP of the present disclosure. In an aspect, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any monomer used to prepare a pre-contacted mixture, or the activator-support, after combining these components. Therefore, the terms "catalyst composition," "catalyst mixture," "catalyst system," and the like, can include both heterogeneous compositions and homogenous compositions.

In an aspect, a catalyst system suitable for the preparation of an IMP comprises a chromium-based catalyst such as chromium catalysts, chromium oxide catalysts, chromium-titanium catalysts or combinations thereof. Nonlimiting examples of chromium-based catalysts suitable for use in this disclosure are described in more detail in U.S. Patent App. Nos. 20100113851 A1 and 20110201768 A1, each of which is incorporated by reference herein in its entirety. Chromium-based catalysts are used throughout the world for the polymerization of polyethylene. Catalyst manufacturers prepare the catalysts, often by placing the chromium on a solid support, such as alumina, silica, aluminophosphate, silica-alumina, silica-titania, silica-zirconia, clay, etc. The support helps to stabilize the activity of the chromium and allows the catalyst to be shipped in an inactive form to the purchaser. Once the catalyst arrives at a polymer manufacturing site, it must be activated for use in the polymerization process. Typically, chromium-based catalysts are activated by calcining or heating large quantities of the catalyst in dry air, in some type of activation apparatus of vessel such as an activator (e.g., a fluidized bed activator). The following references are incorporated as examples of chromium-based catalysts that are suitable for use in the present disclosure: U.S. Pat. Nos. 3,887,494, 3,119,569, 4,081,407, 4,152,503, 4,053,436, 4,981,831, 4,364,842, 4,444,965, 4,364,855, 4,504,638, 3,900,457, 4,294,724, 4,382,022, 4,151,122, 4,247,421, 4,248,735, 4,277,587, 4,177,162, 4,735,931, 4,820,785, and 4,966,951.

In an aspect, prior to using the catalyst in making the IMP, the chromium-based catalyst is heated at a hold temperature in presence of an agent including, but not limited to, air, substantially pure oxygen, a mixture of air and an inert gas, a mixture of oxygen and an inert gas, or combinations thereof. The hold temperature can be a maximum temperature or some other critical temperature other than the maximum temperature. The catalyst can be maintained at the hold temperature for an average time, also referred to as a hold time. The maximum temperature can be from about 230° C. to 900° C., 230° C. to about 540° C., alternatively from about 260° C. to about 480° C., or alternatively from about 300° C. to about 430° C. The hold time can range from about 30 minutes to about 30 hours, alternatively from about 1 hours to about 20 hours, alternatively from about 2 hours to about 15 hours, or alternatively from about 4 hours to about 12 hours. The heating can be in an activator.

After the heating, the chromium-based catalyst can be cooled in the presence of an oxygenating agent and then purged in the presence of an inert agent and can become an activated chromium-based catalyst (also referred to as an activated catalyst). The activated catalyst is then discharged. The discharged activated catalyst can be stored for future use or it can be introduced for use in a reactor system. Besides heating the chromium-based catalyst, additional process steps can be added to the method described herein to activate the chromium-based catalyst, thus obtaining the desired physical or mechanical properties of the resulting IMPs.

In an aspect, a catalyst system suitable for the preparation of an IMP comprises a co-catalyst, which is used to alkylate, scavenge poisons and/or control molecular weight. Examples of suitable co-catalysts of the present disclosure include, but are not limited to alkyls, triethylboron, tri-iso-butylaluminium (TiBAL), triethylaluminum (TEA), methyl aluminoxane (MAO), borates Triethylborane (TEB), and diethyl zinc (DEZ) The concentration of poisons may be minimized, as poisons may impact the reactions and/or otherwise affect polymer product properties.

In aspects, a method of making the IMP comprises contacting a first amount of a monomer of the type in the present disclosure with a chromium-based catalyst of the type in the present disclosure. Under suitable conditions, the contacting can form a first reaction mixture comprising a LMW component (e.g. a LMW homopolymer) of the type in the present disclosure.

The first amount of the monomer (e.g., ethylene) present in the first reaction mixture can be from about 0.5 mol % to about 10 mol %, alternatively from about 1 mol % to about 8 mol %, or alternatively from about 2 mol % to about 6 mol % based on total moles of the first reaction mixture.

In an aspect, a comonomer of the type in the present disclosure is present in the first reaction mixture in an amount of less than about 0.5 mol %, alternatively less than about 0.2 mol % or alternatively less than about 0.1 mol %, based on total moles of the first reaction mixture. In an aspect, the contacting of the first amount of the monomer with the chromium-based catalyst excludes contacting the first amount of the monomer with a comonomer. In such aspect, the resultant LMW component excludes SCB.

In an aspect, the chromium-based catalyst present in the first reaction mixture is in an amount of from about 0.001 wt. % to about 0.1 wt. %, alternatively from about 0.01 wt. % to about 0.08 wt. %, or alternatively from about 0.02 wt. % to about 0.06 wt. % based on a total weight of the liquid fraction of the first reaction mixture.

In an aspect, the method further comprises contacting the first amount of the monomer and the chromium-based catalyst with hydrogen, prior to forming the LMW component in the first reaction mixture. Without being limited by theory, hydrogen can be used to adjust a $M_w$ of the LMW component. The hydrogen present in the first reaction mixture can be in a concentration of from about 0.01 mol % to about 2 mol %, alternatively from about 0.05 mol % to about 1.5 mol %, or alternatively from about 0.1 mol % to about 1 mol % based on total moles of the first reaction mixture.

The contacting of the first amount of the monomer with the chromium-based catalyst can be at a first temperature from about 70° C. to about 110° C., alternatively from about 75° C. to about 108° C., or alternatively from about 80° C. to about 107° C. In an aspect, the contacting is at a pressure of from about 350 psig to about 800 psig, alternatively from about 400 psig to about 700 psig, or alternatively from about 450 psig to about 650 psig. The contacting can be for a period of from about 0.4 hours to about 2 hours, alternatively from about 0.5 hours to about 1.6 hours, or alternatively from about 0.6 hours to about 1.5 hours.

In an aspect, the method further comprises contacting the first reaction mixture with a comonomer and a second amount of the monomer, which when subjected to suitable reaction conditions forms a second reaction mixture comprising the HMW component.

In an aspect, the second amount of the monomer present in the second reaction mixture is from about 1 mol % to about 10 mol %, alternatively from about 2 mol % to about 8 mol %, or alternatively from about 3 mol % to about 6 mol %, based on total moles of the second reaction mixture.

In an aspect, a molar ratio of the comonomer to the second amount of the monomer present in the second reaction mixture is from about 0.1 to about 5, alternatively from about 0.25 to about 2, or alternatively from about 0.4 to about 1. An amount of the comonomer present in the second reaction mixture can be from about 0.1 mol % to about 5 mol %, alternatively from about 0.2 mol % to about 4 mol %, or alternatively from about 0.5 mol % to about 2 mol %, based on total moles of the second reaction mixture.

In an aspect, the method disclosed herein further comprises contacting the first reaction mixture, the comonomer, and the second amount of the monomer with hydrogen at the second temperature to form the second reaction mixture, prior to forming the HMW copolymer in the second reaction mixture. Without being limited by theory, the hydrogen can be used to adjust an average molecular weight of the HMW copolymer. The hydrogen present in the second reaction mixture can be in a concentration of from about 0 mol % to about 1.5 mol %, alternatively from about 0 mol % to about 1.2 mol %, or alternatively from about 0 mol % to about 1 mol %, based on total moles of the second reaction mixture.

The contacting of the first reaction mixture with the comonomer and the second amount of the monomer to form the second reaction mixture comprising the HMW component can be at a second temperature from about 70° C. to about 110° C., alternatively from about 75° C. to about 105° C., or alternatively from about 80° C. to about 100° C. In an aspect, the contacting is at a pressure of from about 350 psig to about 750 psig, alternatively from about 400 psig to about 700 psig, or alternatively from about 450 psig to about 650 psig. The contacting can be for a period of from about 0.2 hours to about 2 hours, alternatively from about 0.4 hours to about 1.6 hours, or alternatively from about 0.5 hours to about 1.5 hours.

In an aspect, the contacting of the first amount of the monomer with the chromium-based catalyst is carried out in a first reactor and forms a first reactor product. In another aspect contacting of the first reactor product with the comonomer and the second amount of the monomer can be carried out in a second reactor. The second reactor can be different from the first reactor. In an aspect, the method disclosed herein further comprises transferring the first reactor product from the first reactor into the second reactor, prior to contacting the first reactor product with the comonomer and the second amount of the monomer.

The first and the second reactors can be of any suitable types of reactors as previously described. In an aspect, the first reactor and/or the second reactor are slurry loop reactors. The first reactor and the second reactor can be operated in series or in parallel configurations. A volume of the first reactor can be about 0.5 to 1.5 times of a volume of the second reactor, alternatively from about 0.7 times to about 1.3 times, or alternatively from about 0.8 times to about 1.2 times. In an aspect, an average residence time of the first reactor is from about 25 minutes to about 120 minutes, alternatively from about 30 minutes to about 120 minutes, alternatively from about 30 minutes to about 95 minutes or alternatively from about 35 minutes to about 90 minutes. In an aspect, an average residence time of the second reactor is from about 12 minutes to about 120 minutes, alternatively from about 25 minutes to about 95 minutes, alternatively from about 45 minutes to about 90 minutes, or alternatively from about 30 minutes to about 90 minutes.

In aspects, the IMP is prepared using an advanced dual loop (ADL) reactor system (also referred to as a conventional ADL setup) comprising two slurry loop reactors in series. An ADL reactor system may be used for producing bimodal polyethylene under conventional conditions, where a BMW component is produced in the first slurry loop reactor, a LMW component is produced in the second slurry loop reactor, and the HMW component and the LMW component are both copolymers having SCB because comonomers are in both of the slurry loop reactors. Under the conventional conditions, a number of SCB present in the BMW component can be designated S1, while a number of SCB present in the LMW component is designated S2.

In aspects, the IMP is prepared using the conventional ADL setup under unconventional conditions. The unconventional conditions (e.g., temperature, pressure, concentrations, residence time, etc.) are as those previously disclosed in the methods of making the IMP and will be further discussed later. In aspects, using an ADL reactor system, IMPS are formed by polymerizing monomers in the first slurry loop reactor, transferring the contents (e.g., the first reactor product comprising the LMW component) to the second slurry loop reactor, and continuing the polymerization with the introduction of additional monomers, comonomers, and optionally hydrogen. Generally, the present disclosure contemplates the number of SCB present in the LMW component of the IMP is designated I2 where I2 is from 0 to less than about S2, and the number of SCB in the HMW component of the IMP is designated I1 where I1 is greater than about S1. The ADL reactor system and relative operations to make the IMP will be discussed in detail as follows.

Referring to FIG. 1, an exemplary polymerization reactor system 20 has two slurry loop reactors 50A, 50B disposed and operated in series. Additional loop reactors or other reactors (e.g., gas phase) may be disposed in series or parallel in the illustrated combination. Moreover, in alternative aspects, processing equipment may be disposed between the two slurry loop reactors 50A, 50B, Further, the operational configuration of the two depicted slurry loop reactors 50 may be shifted to a parallel operation. The present disclosure contemplates a variety of reactor system configurations such as those disclosed in U.S. Patent Application No. 2011/0288247.

Slurry loop reactors 50A, 50B are of the type previously described and are generally composed of segments of pipe connected by smooth bends or elbows. Representation of the slurry loop reactors 50A, 50B in FIG. 1 is simplified, as appreciated by the skilled artisan. An exemplary slurry reactor 50A, 50B configuration may include eight to sixteen or other number of jacketed vertical pipe legs, approximately 24 inches in diameter and approximately 200 feet in length, connected by pipe elbows at the top and bottom of the legs. FIG. 1 shows a four-leg segment reactor arranged vertically, which could also be arranged horizontally. The reactor jackets 52 are normally provided to remove heat from the exothermic polymerization via circulation of a cooling medium, such as treated water, through the reactor jackets 52.

The slurry loop reactors 50A, 50B may be used to carry out monomer (e.g., ethylene) polymerization under slurry conditions in which insoluble particles of polymer (e.g., polyethylene) are formed in a fluid medium and are suspended as slurry until removed. A respective motive device, such as pump 54A, 54B, circulates the fluid slurry in each slurry loop reactor 50A, 50B. An example of a pump 54A, 54B is an in-line axial flow pump with the pump impeller disposed within the interior of the slurry loop reactor 50A, 50B to create a turbulent mixing zone within the fluid medium. The impeller may also assist in propelling the fluid medium through the closed loop of the reactor at sufficient speed to keep solid particulates, such as the catalyst or polymer product, suspended within the fluid medium. The impeller may be driven by a motor 56A, 56B or other motive force.

The fluid medium within each slurry loop reactor 50 may include monomers and comonomers, diluent, co-catalysts (e.g., alkyls, triethylboron, TiBAL, TEA, MAO, borates, TEB, etc.), molecular weight control agents (e.g., hydrogen), and any other desired co-reactants or additives. These components are added to the reactor interior via inlets or conduits at specified locations, such as depicted at feed streams 58A, 58B. In aspects, feed stream 58A may contain no or little amount of comonomers.

Likewise, a catalyst (e.g., an activated chromium-based catalyst of the present disclosure), may be added to the slurry loop reactor 50A via a conduit at a suitable location, such as depicted at feed stream 60, which may include a diluent carrier. Again, the conduits that feed the various components have a tie-in (e.g., flange or weld) to the slurry loop reactor 50. In the illustrated aspect, catalyst feed 60 is added to the first slurry loop reactor 50A in series but not to the second slurry loop reactor 50B. However, the catalyst may discharge in a fluff slurry 21 from the first slurry loop reactor 50A to the second slurry loop reactor 50B. Moreover, while not depicted, a fresh catalyst 60 (e.g., an activated chromium-based catalyst of the present disclosure) may be added to the second slurry loop reactor 50B in certain aspects. In total, the added components including the catalyst and other feed components generally compose a fluid medium within the slurry loop reactor 50A, 50B in which the catalyst is a suspended particle.

The reaction conditions, such as temperature, pressure, and reactant concentrations, in each slurry loop reactor 50 are regulated to facilitate the desired properties and production rate of a polymer of the type disclosed herein (i.e., IMP) in the slurry loop reactor, to control stability of the slurry loop reactor, and the like. Temperature is typically maintained below that level at which the polymer product would go into solution, swell, soften, or become sticky. Due to the exothermic nature of the polymerization reaction, a cooling fluid may be circulated through jackets 52 around portions of the slurry loop reactor 50A, 50B to remove excess heat, thereby maintaining the temperature within the desired range. Generally the temperature in the slurry loop reactor 50A is maintained at the first temperature as disclosed previously, and the temperature in the slurry loop reactor 50B is maintained at the second temperature as disclosed previously. Likewise, pressure in each slurry loop reactor 50A, 50B may be regulated within a desired pressure range, as described previously.

As the polymerization reaction proceeds within each slurry loop reactor 50, the monomer (e.g., ethylene) and comonomers (e.g., 1-hexene) polymerize to form polymers that are substantially insoluble in the fluid medium at the reaction temperature, thereby forming a slurry of solid particulates within the medium. These solid particulates may be removed from each slurry loop reactor 50A, 50B via a settling leg or other means, or a continuous take-off (CTO), and so on.

As mentioned, FIG. 1 depicts two slurry loop reactors 50A, 50B in series. The two slurry loop reactors 50A, 50B may be operated such that the polymer fluff in the fluff slurry 22 discharging from the second reactor 50B is multimodal (e.g., bimodal). The reactor operating conditions may be set such that the polymer polymerized in the first slurry loop reactor 50A is different than the polymer polymerized in the second slurry loop reactor 50B. Thus, with two slurry loop reactors, a first polymer (e.g., the LMW component) produced in the first slurry loop reactor 50A and the second polymer (e.g., the MAW component) produced in the second slurry loop reactor 50B may combine to give an IMP of the type in the present disclosure. In an aspect, the resultant IMP is multimodal, alternatively bimodal.

In aspects, of the present disclosure, the contacting of the first amount of the monomer with the chromium-based catalyst is in the first slurry loop reactor 50A, the contacting of the first reaction mixture with the comonomer and the second amount of the monomer is in the second slurry loop reactor 50B. Reaction conditions such as temperature, pressure, concentrations of the monomer, the comonomer, and hydrogen, and residence time are as previously disclosed herein. The methods may also include feeding less hydrogen to the second slurry loop reactor 50B than the first slurry loop reactor 50A. In an aspect, the ratio of the concentration of hydrogen in the first slurry loop reactor 50A to that in the second slurry loop reactor 50B is from about 1 to about 200, alternatively from about 1.5 to about 100 or alternatively from about 2 to about 50. In an aspect, the same hydrogen concentration may be maintained in each slurry loop reactor 50A, 50B. The comonomer may be fed to the slurry loop reactor 50B, while no comonomer may be fed to the slurry loop reactor 50A. Furthermore, the first polymer produced in the first slurry loop reactor 50A can be a LMW component (e.g., a LMW homopolymer) of the type in the present disclosure, and the second polymer produced in the second slurry loop reactor 50B can be a HMW component (e.g., a LMW copolymer) of the type in the present disclosure. The resultant LMW component and the HMW component combine to form an IMP of the type in the present disclosure.

As depicted in FIG. 1, the fluff slurry 22 comprising an IMP of the type in the present disclosure discharges from the second slurry loop reactor 50B and is subjected to downstream processing, such as in a diluent/monomer recovery system 24. The product fluff slurry 22 may discharge through a settling leg, a continuous take-off (CTO), or other valve configurations. The product fluff slurry 22 may discharge intermittently such as through a settling leg configuration, or instead may discharge continuously. A variety of discharge configurations are contemplated for a continuous discharge. Employment of an isolation valve (e.g., full-bore Ram valve) without an accompanying modulating valve may provide for continuous discharge of slurry from the slurry loop reactor. Further, a CTO is defined as a continuous discharge having at least a modulating flow valve, and provides for a continuous discharge of slurry from the slurry loop reactor. In certain examples, a CTO has an isolation valve (e.g., Ram valve) at the reactor wall and a modulating valve (e.g., v-ball valve) on the discharge conduit. A Ram valve in a closed position may beneficially provide a surface that is flush with the inner wall of the slurry loop reactor to preclude the presence of a cavity, space, or void for polymer to collect when the Ram valve is in the closed position.

In operation, depending on the positioning of the discharge on the slurry loop reactor, for example, a discharge slurry 22 having a greater solids concentration than the slurry circulating in the slurry loop reactor 50B may be realized with a discharge configuration having an isolation valve (Rani valve) alone, or having a CTO configuration with an isolation valve (Ram valve) and modulating valve 25. Exemplary CTO configurations and control, and other discharge configurations, may be found in the aforementioned U.S. Patent Application No. 2011/0288247, and in U.S. Pat. No. 6,239,235.

In the illustrated aspect, the product fluff slurry 22 discharges through a CTO. In certain examples, a CTO has a Ram valve at the slurry loop reactor 50B wall, and a modulating flow control valve 25 (e.g., v-hall control valve) on the discharge conduit. Again, however, in an alternative aspect, the product fluff slurry 22 may discharge through a settling leg configuration, for example, in lieu of a CTO.

A transfer fluff slurry 21 discharges from the first slurry loop reactor 50A to the second slurry loop reactor 50B via a transfer line 21L. The contents of transfer fluff slurry 21 may be representative of the contents (e.g., the first reactor product including the LMW component) of the first slurry loop reactor 50A. However, the solids concentration may be greater in the transfer slurry 21 than in the first slurry loop reactor 50A, depending on the positioning of the inlet of the transfer line 21L on the first slurry loop reactor 50A, for example, and other considerations. The transfer fluff slurry 21 may discharge from the first slurry loop reactor 50A into the transfer line 21L through a settling leg, an isolation valve (e.g., a Rani valve), a continuous take-off (which the CTO has an isolation or Ram valve and a modulating valve), or other valve configuration. In the illustrated aspect, the discharge of the transfer slurry 21 from the first slurry loop reactor 50A is continuous and not directly modulated. A CTO or settling leg is not employed. Instead, the transfer slurry 21 discharges through an isolation valve or Ram valve (not shown) on the transfer line 21L at the reactor wall and without a modulating valve in this example. In a particular example, the transfer slurry 21 discharges through a full-bore Ram valve maintained in a hill-open position, and not additionally through a modulating valve.

The Ram valve may provide for isolation of the transfer line 21L from the slurry loop reactor 50A when such isolation is desired. A Rain valve may also be positioned at the outlet of the transfer line 21L at the wall of the second slurry loop reactor 50B to provide for isolation of the transfer line 21L from the second slurry loop reactor 50B when such isolation is desired. It may be desired to isolate the transfer line 21L from the first and second slurry loop reactors 50A, 50B during maintenance or downtime of the reactor system 20, or when an alternate transfer line is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Rain valves) from service.

Control of pressure (and throughput) in the first slurry loop reactor 50A and the second slurry loop reactor 50B may be facilitated by operation of the CTO flow control valve 25. In some examples, the pressure in the first slurry loop reactor 50A may float on the pressure in the second slurry loop reactor 50B. The slurry loop reactors 50A, 50B may be maintained at the same, similar, or different pressure. Pressure elements or instruments may be disposed on the slurry loop reactors 50A, 50B and on the transfer line 21L. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example. The various instruments may have local indication of the sense variable. For instance, a pressure element or instrument may be or have a local pressure gauge and a temperature element or instrument may be or have a local temperature gauge, both of which may be read locally by an operator or engineer, for example.

The inlet position of the transfer line 21L may couple to the first slurry loop reactor 50A on the discharge side of the circulation pump 56A in the first slurry loop reactor 50A. The outlet position of the transfer line 21L may couple to the second slurry loop reactor 50B on the suction side of the circulation pump 56B in the second slurry loop reactor 50B. Such a configuration may provide a positive pressure differential (i.e., a driving force) for flow of transfer slurry 21 through the transfer line 21L from the first slurry loop reactor 50A to the second slurry loop reactor 50B. In one example, a typical pressure differential (provided from the discharge of the first pump 54A to the suction of the second pump 54B) is about 20 pounds per square inch (psi). In certain examples, pressure elements 61-1 and 61-2 that indicate pressure may be disposed on the transfer line 21L and may be situated to determine differential pressure across the transfer line 21L, for instance.

In aspects, IMPs of the present disclosure may be formed into articles of manufacture or end use articles using any suitable technology such as extrusion, blow molding, injection molding, fiber spinning, thermoforming, and casting. For example, the IMP may be blow molded into an end use article such as a container, a bottle, or a component of another product. Examples of other end use articles into which the IMP may be formed include household containers, pipes, films, fibers, drums, fuel tanks, geomembranes, liners, and so forth. Moreover, the articles formed by the IMPs and the method of forming the articles may be varied to determine the desired final product properties.

In an aspect, the previously described IMPs are blow molded into articles. In such aspects, blow molded articles having HLMI values ranging from about 12 g/10 min to about 30 g/10 min and densities greater than or equal to about 0.952, both their ESCR-A values and their ESCR-B values are greater than about 50 hours, alternatively greater than about 225 hours, or greater than about 1000 hours.

In an aspect, the previously described IMPs are a bimodal polymer composition having a density of from about 0.930 gram per cubic centimeter (g/cc) to about 0.970 g/cc, a ratio of high load melt index:melt index of from about 10 to about 150, and which when blow molded into an article has an ESCR of from about 25 hours to about 300 hours when measured in accordance with ASTM D1693. In an aspect, the previously described IMPs are a bimodal polymer composition having a density of from about 0.930 gram per cubic centimeter (g/cc) to about 0.970 g/cc; a ratio of high load melt index:melt index of from about 10 to about 100, and which when blow molded into an article has an ESCR of from about 25 hours to about 300 hours when measured in accordance with ASTM D2561.

A polymer often tends to swell during blow molding. Percent weight swell measures the amount a molten polymer expands immediately as it exits the die. It is a measure of the "memory" of the polymer chains as they seek to relax and thus reform the polymer shape. Weight swell determines how tight the die gap must be adjusted to provide a constant bottle weight. If a polymer has high weight swell, the die gap required will be tighter to make the proper part weight. In so doing, it will require higher stress to push the polymer through the die than a lower weight swell polymer. Weight swell is defined as the ratio of the die gap to the final bottle wall thickness. The weight swell values of the IMPs described herein may be less than about 700, less than about 500, less than about 450, or less than about 400. The weight swell values of the IMPs described herein may be equal to or greater than about 0, alternatively equal to or greater than about 50, alternatively equal to or greater than about 100, alternatively equal to or greater than about 120, alternatively equal to or greater than about 150, alternatively equal to or greater than about 200; alternatively less than about 700, alternatively less than about 600, alternatively less than about 500, alternatively less than about 400, or alternatively less than about 300.

As a polymer is subjected to increasing shear rates during blow molding, it eventually breaks slips or experiences a so-called melt fracture. In an embodiment an IMP prepared as described herein may display one or more types of melt fracture during polymer melt formation and processing such as extrusion molding. The type, extent, and conditions under which the polymer melt experiences melt fracture may vary depending on the polymer microstructure. In an aspect, a method of identifying an IMP having desirable processing characteristics comprises obtaining a plurality of IMPs of the type disclosed herein and measuring the shear stress as a function of shear rate for the plurality of polymer using capillary rheometry.

Capillary rheometry is a technique whereby a sample undergoes extrusion through a die of defined dimensions and the shear pressure drop across the die is recorded at set volumetric flow rates. In an aspect, an IMP of the type disclosed herein is the subject of a capillary extrusion experiment to characterize the melt fracture behavior of the IMP. The capillary extrusion experiment may be carried out using any suitable methodology. For example, the capillary extrusion experiments may be carried out at 190° C., using a dual-bore capillary rheometer (Rosand RH-7, Malvern) operated in constant speed mode. A capillary die with 1 mm diameter and of 16 mm length and an orifice die with 1 mm diameter may be used. The entrance angle for the dies can be 180°, and the contraction ratio from the reservoir barrel to the die may be about 15. A step shear rate test can be performed for a given sample to obtain the apparent wall shear rate ($\dot{\gamma}_A$) and apparent wall shear stress ($\sigma_A$) according to equation 4:

$$\dot{\gamma}_A = \frac{4Q}{\pi R^3} \text{ and } \sigma_A = \frac{R}{2}\frac{\Delta P}{L} \qquad (4)$$

where R is the capillary radius, $\Delta P$ is the measured pressure drop across the capillary, L is the capillary length, and Q is the imposed flow rate. Bagley and Rabinowitsch corrections are applied to obtain more realistic shear stress value at the wall ($\sigma_W$) and shear rate ($\dot{\gamma}_W$) respectively according to equation 5:

$$\sigma_W = \frac{R}{2}\frac{(\Delta P - P_o)}{L} \text{ and } \dot{\gamma}_W = \left(\frac{3+b}{4}\right)\dot{\gamma}_A \qquad (5)$$

where $P_O$ is measured pressure for the orifice die and b=d(log $\dot{\gamma}_A$)/d(log $\sigma_W$). Extrudates can be collected at different shear rates and imaged using an optical microscope to identify onset critical stresses and shear rates of the melt fractures.

The critical stress refers to the wall shear stresses that serves as the trigger for the onset of a particular extrudate distortion or melt fracture. The smooth to matte transition may also be referred to as surface melt fracture (SMF) or the sharkskin melt fracture (SSMF). The onset of the smooth to matte transition is a polymer instability that originates at the exit of a die during extrusion of melted polymer (i.e., melt) through the die. The smooth to matte transition may be attributable to the acceleration (high stretching rate) of the melt as it exits the die. Without wishing to be limited by theory, it is hypothesized that melt leaving the die in the neighborhood of the wall experiences a large, rapid, tensile deformation as the velocity field adjusts from the no-slip boundary condition to the free-surface condition. The large stresses on the free surface cause periodic cracks that result into small amplitude periodic distortions termed sharkskin, which is a visible surface defect present in the product being produced from the die (e.g., pipe). Various benefits may be realized by utilization of the presently disclosed compositions and methods. Compared to single-loop counterparts and ADL counterparts made under conventional conditions, the IMP made by the disclosed methods has improved mechanical properties such as ESCR, at comparable density and MI. In the present disclosure, most to all of the SCB can be in the HMW component which is a copolymer while the HMW component is a homopolymer having a reduced amount of SCB when compared to the HMW component. In some aspects, SCB in the LMW is undetectable. Thus at the same density, without wishing to be bound by theory), IMPs made by the disclosed methods have more SCB located in the HMW component, which enhances the probability of forming tie chains. Therefore mechanical properties such as ESCR of the presently disclosed IMP are improved.

EXAMPLES

The subject matter having been generally described, the following examples are given as particular aspects of the disclosure and are included to demonstrate the practice and advantages thereof, as well as preferred aspects and features of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific aspects which are disclosed and still obtain a like or similar result without departing from the scope of the inventions of the instant disclosure. It is understood that the examples are given by way of illustration and are not intended to limit the specification of the claims to follow in any manner.

Example 1

The effects of changing the location of SCB in IMPs of the present disclosure were investigated. Three scenarios were included in the example and the results are shown in Table 2. In the example, PSP2 was first calculated according to Reference 1 (Ref 1, DesLauriers and D. C. Rohlfing in *Macromolecular Symposia*, 2009, 282, 136) using simulated MWD and SCBD for each of the cases. Natural draw ratio (NDR) was subsequently calculated using the NDR vs. PSP2 relationship established in Ref 1. The calculated NDR was then used to predict ESCR values using a relationship established in Reference 2 and Reference 3 (Ref 2: R. A. C. Debliek, D. J. M. van Beek, K. Remerie, I. M. Ward, Polymer, 2011, 52, 2979. Ref 3: L. Kurelec, M. Teeuwen, H. Schoffeleers, R. Deblieck, *Polymer*, 2005, 46, 6369). ESCR ratio is a ratio of the calculated ESCR to that of the control Marlex® HHM 5502BN high density polyethylene which was set at 100%. Marlex® HHM 5502BN high density polyethylene is commercially available from Chevron Phillips Chemical Company LP. ESCR of the Marlex® HHM 5502BN high density polyethylene is listed in Table 1 below

TABLE 1

| ESCR of Marlex ® HHM 5502BN high density polyethylene | |
|---|---|
| ESCR, condition B (100% Igepal), $F_{50}$ | 24 hours |
| ESCR, condition A (100% Igepal), $F_{50}$ CCO-630 | 45 hours |
| Bottle ESCR, $F_{50}$, at 60° C. | 250 hours |

Scenario 1 involved two samples designated Cases 1 and 2. Cases 1 and 2 were multimodal polymers having identical MWD but differed in the SCBD in that Case 1 had SCB located in the LMW component and the HMW component had little to no SCB, while Case 2 had SCB in the HMW component and little to no SCB was present in the LMW component. Case 1 is termed the "conventional SCBD" while Case 2 is termed "reverse SCBD." The ESCR ratio of Case 1 was 157% while Case 2 (i.e., having reverse SCBD) had an ESCR ratio that increased to 238%.

Scenario 2 had samples designated Case 3 to Case 7. All of the polymers used in Cases 3 through 7 had the same MW and MWD, but with a MI lower than the control polymer Marlex® HHM 5502BN. Case 3 was another control where all the SCB was placed in the LMW component while the HMW component was a homopolymer with no SCBD. Cases 4 through 7 were of similar density, where all the SCB was placed in the HMW component while the LMW component was a homopolymer, and had a reverse SCBD with variations in the total SCB content. Cases 3 through 7 displayed improved ESCR ratios with values ranging from 197% to 433%.

Scenario 3 had samples designated Cases 8 and 9. These two cases had the same MWD and reverse SCBD. The polymers of Cases 8 and 9 were made under the conventional ADL setup where the first reactor makes HMW copolymer component while the second reactor makes a LMW higher density copolymer.

The polymers in Cases 8 and 9 were prepared using a chromium-based catalyst resulting in a larger amount of unreacted 1-hexene being transferred to the second reactor, where it was incorporated into polymer chain of the LMW component. This process results in the production of a LMW component that is a copolymer of ethylene and a comonomer (e.g., 1-hexene). With the same MWD, density and MI, Cases 8 and 9 were predicted to display a reduced ESCR than IMPs made using the methods in the present disclosure.

Figure 2:
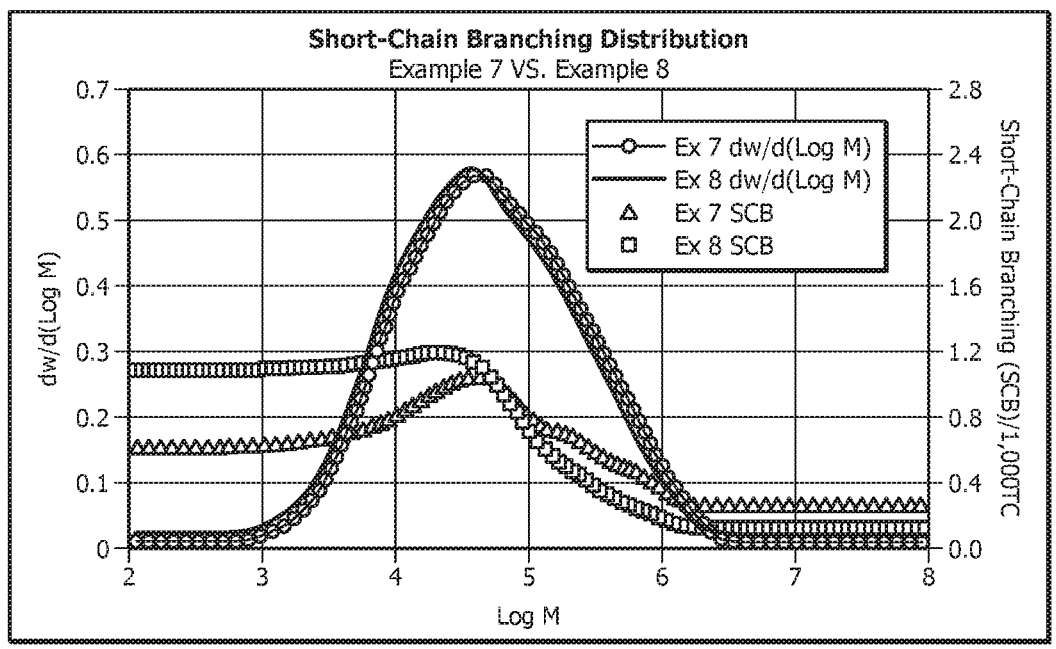
FIG. 2 is a plot of the distributions of molecular weight and short chain branching for some samples from Example 1.

As shown in FIG. 2, the polymers of Case 7 and Case 8 had the same MWD and the same density. However, Case 7 was an IMP prepared as disclosed herein, while Case 8 was made using the conventional ADL setup under conventional condition. Referring to FIG. 2, a plot of the SCBD for Cases 7 and 8 demonstrates that difference in the location of SCB for the polymer samples where the Case 7, an IMP of the present disclosure, had the SCB located within the HMW component. In sharp contrast, Case 8 had the SCB located within the LMW component resulting in an ESCR ratio of 351% for Case 8 while the ESCR ratio for Case 7 was 433%.

Case 10 was a commercial polymer composition Marlex® 5502BN made in a single-loop reactor used as a control herein.

TABLE 2

Comparison of results in different cases

| Example cases | Description | SCB Profile | Mn | Mw (g/mol) | Mz | PDI | Total SCB (#/1000 TC) | Density g/cc | MI[b] g/10 min/ 2.16 kg | PSP 2[c] | ESCR Ratio[d, e] |
|---|---|---|---|---|---|---|---|---|---|---|---|
| Case 1 | HMW, no SCB; LMW, SCB | Conventional SCBD | 18.23 | 142.1 | 605.7 | 7.80 | 0.793 | 0.957 | 0.78 | 6.53 | 157% |
| Case 2 | HMW, SCB; LMW, no SCB | Reverse SCBD | 18.23 | 142.1 | 605.7 | 7.80 | 0.730 | 0.956 | 0.78 | 6.94 | 238% |
| Case 3 | HMW, no SCB; LMW, SCB | Conventional SCBD | 16.4 | 158.3 | 707.1 | 9.65 | 0.793 | 0.958 | 0.49 | 6.75 | 197% |
| Case 4 | HMW, SCB; LMW, no SCB | Reverse SCBD | 16.4 | 158.3 | 707.1 | 9.65 | 0.634 | 0.957 | 0.49 | 7.38 | 369% |

TABLE 2-continued

Comparison of results in different cases

| Example cases | Description | SCB Profile | Mn (g/mol) | Mw (g/mol) | Mz | PDI | Total SCB (#/1000 TC) | Density g/cc | MI[b] g/10 min/ 2.16 kg | PSP 2[c] | ESCR Ratio[d, e] |
|---|---|---|---|---|---|---|---|---|---|---|---|
| Case 5 | same as case 4 with increased SCB at HMW | Reverse SCBD | 16.4 | 158.3 | 707.1 | 9.65 | 0.697 | 0.957 | 0.49 | 7.44 | 392% |
| Case 6 | same as case 4 with increased SCB at HMW | Reverse SCBD | 16.4 | 158.3 | 707.1 | 9.65 | 0.729 | 0.957 | 0.49 | 7.48 | 408% |
| Case 7 | same as case 4 with increased SCB at HMW | Reverse SCBD | 16.4 | 158.3 | 707.1 | 9.65 | 0.793 | 0.956 | 0.49 | 7.54 | 433% |
| Case 8 | HMW, copolymer; LMW, ½ SCB; keep final SCB same as case 2 | Reverse SCBD | 16.4 | 158.3 | 707.1 | 9.65 | 0.730 | 0.956 | 0.49 | 7.33 | 351% |
| Case 9 | HMW, copolymer; LMW, ⅓ SCB; keep final SCB same as case 3 | Reverse SCBD | 16.4 | 158.3 | 707.1 | 9.65 | 0.730 | 0.957 | 0.49 | 7.33 | 351% |
| Case 10[a] | Marlex ® HHM 5502BN control | Conventional SCBD | (21.09) | (141.9) | (797.6) | (6.73) | (0.710) | 0.957 (0.955) | 1.16 (0.35) | 6.08 | 100% |

[a]Numbers in parentheses are measured ones.
[b]Calculated MI without considering long chain branches (LCB).
[c]Calculated based on P. J. DesLauriers and D. C. Rohlfing, *Macromolecular Symposia*, 2009, 282, 136.
[d]ESCR calculated based on R. A. C. Debliek, D. J. M. van Beek, K. Remerie, I. M. Ward, *Polymer*, 2011, 52, 29797 and L. Kurelec, M. Teeuwen, H. Schoffeleers, R. Deblieck, *Polymer*, 2005, 46, 6369.
[e]The ratio of calculated ESCR relative to that of Marlex ® HHM 5502BN control (i.e., Case 10), which was set at 100%.

Example 2

The effects of hydrogen concentration and reaction temperature on polymerization reactions using chromium-based catalysts were investigated. The chromium-based catalysts were activated at 788° C. before use. Polymerization tests were conducted in a 2.2 liter stainless-steel reactor equipped with a marine stirrer rotating at 500 rpm. The reactor was surrounded by a steel jacket, through which a mixture of cold water and steam was passed to precisely control the temperature to within half a degree centigrade, with the aid of electronic control instruments.

Unless otherwise stated, a small amount (0.01 to 0.10 grams normally) of the solid catalyst prepared as described herein was first charged under nitrogen to the dry reactor. Next 1.2 liter of isobutane liquid was charged and the reactor and heated up to the target reactor temperature. Finally ethylene was added to the reactor to maintain a fixed pressure, 550 psig, during the experiment. The stirring was allowed to continue until the total flow of ethylene reached the targeted amount (as a multiple of the weight of catalyst charged to the reactor).

After the desired productivity was reached, the ethylene flow was stopped and the reactor slowly depressurized and opened to recover a granular polymer powder, which was weighed. In all cases the reactor was clean with no indication of any wall scale, coating or other forms of fouling. The polymer powder was then removed and weighed. Activity was specified as grams of polymer produced per gram of solid catalyst charged per hour.

Figure 3:
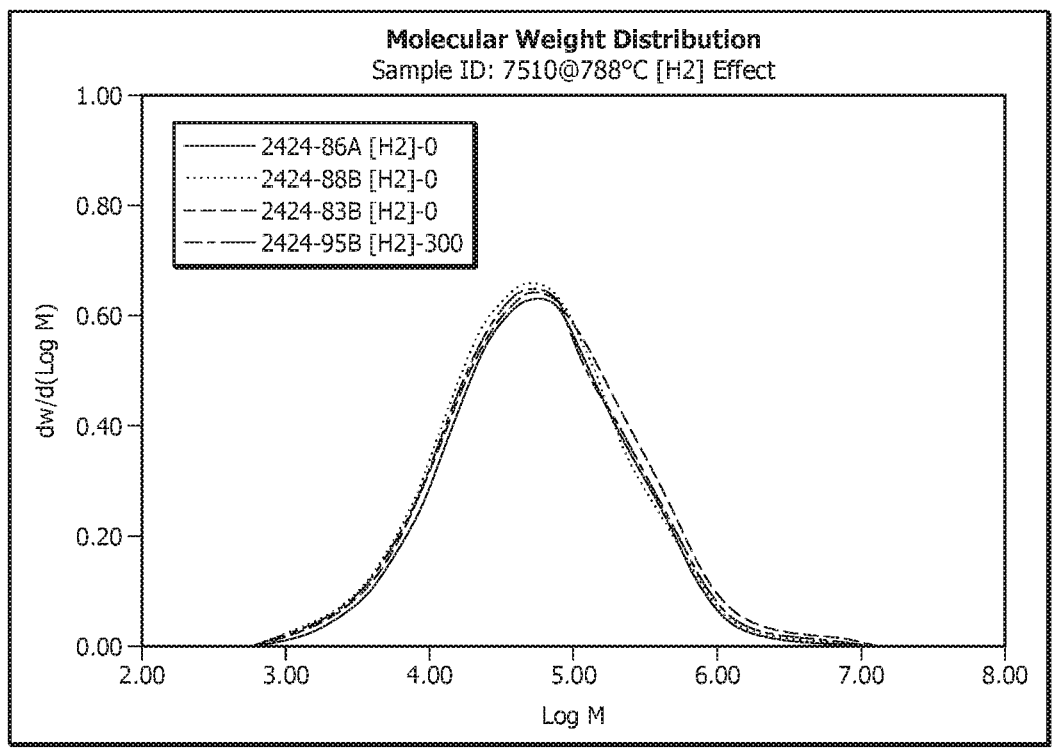
FIG. 3 is a plot of the molecular weight distribution at different hydrogen concentrations for some samples from Example 2.

The conditions and some of the results are listed in Table 3. Results show that MW of reaction products prepared using chromium-based catalysts was insensitive to $H_2$ concentration. Referring to FIG. 3, a comparison of polymers prepared in absence of $H_2$ and those prepared in the presence of 300 mg of $H_2$ did not appear to alter the MW. In contrast, the MW of the reaction products prepared using chromium-based catalysts was sensitive to the reaction temperature. It was observed that increasing the reaction temperature resulted in MW decreases with concomitant increases in the MI which is illustrated in FIG. 4.

Figure 4:
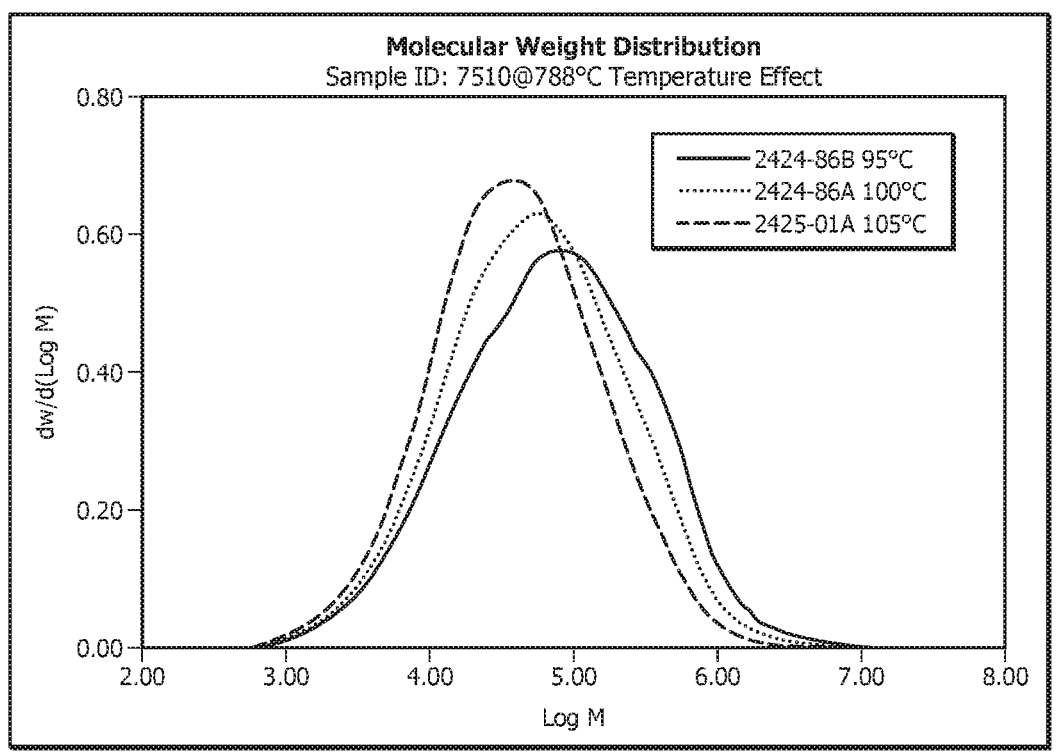
FIG. 4 is a plot of the molecular weight distribution at different reaction temperatures for some samples from Example 2.

TABLE 3 polymerization conditions for MWD presented in FIGS. 3 and 4

| Run # | Reaction Temperature °C. | 1-Hexene ml | H₂ mg | Induction time min | Total reaction time min | Yield g | Productivity g/g | Activity g/g/hr | HLMI | I10 | MI |
|---|---|---|---|---|---|---|---|---|---|---|---|
| | | | | | Temperature Effect | | | | | | |
| 1 | 95 | 5 | 0 | 16 | 41 | 166 | 1937 | 4649 | 8.45 | 1.21 | 0.00 |
| 2 | 100 | 5 | 0 | 19 | 42 | 171 | 2038 | 5317 | 32.76 | 6.83 | 0.37 |
| 3 | 105 | 5 | 0 | 16 | 40 | 183 | 2020 | 5050 | 137.97 | 33.16 | 2.91 |
| | | | | | [H2] Effect | | | | | | |
| 4 | 100 | 5 | 0 | 14 | 36 | 245 | 2010 | 5481 | 33.881 | 6.77 | 0.35 |
| 5 | 100 | 5 | 0 | 19 | 42 | 171 | 2038 | 5317 | 32.756 | 6.83 | 0.37 |
| 6 | 100 | 5 | 0 | 18 | 43 | 168 | 1970 | 4727 | 54.357 | 11.42 | 0.64 |
| 7 | 100 | 5 | 300 | 16 | 40 | 160 | 2038 | 5096 | 47.74 | 9.92 | 0.55 |

Example 3

In this example, the ADL reactor system will be used to produce a polymer composition with a target density of 0.937 g/cc.

Under conventional conditions, the first reactor will be used to make a HMW and low density product, thus the product from the first reactor may have a density of about 0.920 g/cc. This would be a challenge in operation of the first reaction due to polymer swelling issue unless reaction temperature is set to be relatively low, which in turn would hurt the throughput. Adopting the disclosed methods, however, density of the product from the first reactor will be about 0.955 g/cc, while density of the product from the second reactor will be the targeted 0.937 g/cc, which would be manageable by the ADL reactor system.

Therefore, the presently disclosed methods can produce polymer compositions using the conventional ADL setup under the presently disclosed unconventional conditions, which otherwise would not be possible using the conventional ADL setup under conventional conditions.

Additional Disclosure

The following is provided as additional disclosure for combinations of features and aspects of the present invention.

A first aspect which is a bimodal polymer composition comprising a lower molecular weight homopolymer and a higher molecular weight copolymer wherein the bimodal polymer composition has a density of from about 0.930 gram per cubic centimeter (g/cc) to about 0.970 g/cc, a ratio of high load melt index:melt index of from about 10 to about 150 and an Environmental Stress Crack Resistance (ESCR) of from about 25 hours to about 300 hours when measured in accordance with ASTM D1693 or ASTM D2561.

A second aspect which is the composition of the first aspect wherein a weight ratio of the lower molecular weight homopolymer to the higher molecular weight copolymer present in the polymer composition is from about 35:65 to about 65:35.

A third aspect which is the composition of any of the first through second aspects wherein a number of short chain branches present in the lower molecular weight homopolymer is from about 0 per 1000 total carbon atoms to less than about 2 per 1000 total carbon atoms.

A fourth aspect which is the composition of any of the first through third aspects wherein the lower molecular weight homopolymer has a weight average molecular weight of from about 50,000 g/mol to about 250,000 g/mol.

A fifth aspect which is the composition of any of the first through fourth aspects wherein a number of short chain branches present in the higher molecular weight copolymer is in a range of from about 0.5 per 1000 total carbon atoms to about 10 per 1000 total carbon atoms.

A sixth aspect which is the composition of any of the first through fifth aspects wherein the higher molecular weight copolymer has a weight average molecular weight of from about 135,000 g/mol to about 350,000 g/mol.

A seventh aspect which is the composition of the sixth aspect wherein a monomer of the lower molecular weight homopolymer comprises ethylene, propylene, butene, 1-pentene, 1-hexene, 1-octene, 1-decene, or combinations thereof.

An eighth aspect which is the composition of any of the first through seventh aspects wherein a comonomer of the higher molecular weight copolymer comprises unsaturated hydrocarbons with 3 to 12 carbon atoms.

A ninth aspect which is the composition of any of the first through eighth aspects wherein a comonomer of the higher molecular weight copolymer comprises an alpha-alkene or a derivative of an alpha-alkene.

A tenth aspect which is the composition of the ninth aspect wherein a comonomer of the higher molecular weight copolymer comprises 1-hexene.

An eleventh aspect which is the composition of any of the first through tenth aspects having a density of from about 0.938 g/cc to about 0.965 g/cc.

A twelfth aspect which is the composition of any of the first through eleventh aspects having a Melt Index (MI) of from about 0.01 grams per 10 minutes (g/10 min) to about 1.0 g/10 min at a temperature of 190° C. and a weight of 2.16 kg, when measured in accordance with ASTM D1238-82 condition E.

A thirteenth aspect which is the composition of any of the first through twelfth aspects having a High Load Melt Index (HLMI) of from about 1 g/10 min to about 100 g/10 min at a temperature of 190° C. and a weight of 21.6 kg, when measured in accordance with ASTM D1238-82 condition F.

A fourteenth aspect which is the composition of any of the first through thirteenth aspects having an I10 of from about 0.01 g/10 min to about 10 g/10 min when subjected to a force of 10,000 grams at 190° C. as determined in accordance with ASTM D1238-82 condition N.

A fifteenth aspect which is the composition of any of the first through fourteenth aspects having a number average molecular weight (Mn) of from about 10,000 g/mol to about 50,000 g/mol.

A sixteenth aspect which is the composition of any of the first through fifteenth aspects having a weight average molecular weight (Mw) of from about 100,000 g/mol to about 300,000 g/mol.

A seventeenth aspect which is the composition of any of the first through sixteenth aspects having a z-average molecular weight (Mz) of from about 650,000 g/mol to about 3,500,000 g/mol.

An eighteenth aspect which is the composition of any of the first through seventeenth aspects having a ratio of Mz to Mw (Mz/Mw) of from about 500,000 to about 3,500,000.

A nineteenth aspect which is the composition of any of the first through eighteenth aspects having a polydispersity index (PDI) of from about 6 to about 30.

A twentieth aspect which is the composition of any of the first through nineteenth aspects having a primary structure parameter (PSP2) of from about 6.0 to about 13.

A twenty-first aspect which is a chromium-catalyzed polymer composition comprising (i) a lower molecular weight homopolymer and (ii) a higher molecular weight copolymer, wherein the bimodal polymer composition has an Environmental Stress Crack Resistance (ESCR) of from about 25 hours to about 300 hours when measured in accordance with ASTM D1693 or ASTM D2561.

A twenty-second aspect which is a method of making a polymer composition, comprising: contacting a first amount of a monomer with a chromium-based catalyst at a first temperature to form a first reaction mixture comprising a lower molecular weight homopolymer; and contacting the first reaction mixture comprising the lower molecular weight homopolymer with a comonomer and a second amount of the monomer at a second temperature to form a second reaction mixture comprising a higher molecular weight copolymer, wherein the polymer composition comprises the lower molecular weight homopolymer and the higher molecular weight copolymer.

A twenty-third aspect which is the method of the twenty-second aspect further comprising heating the chromium-based catalyst at a maximum temperature, prior to contacting the first amount of the monomer with the chromium-based catalyst at a first temperature.

A twenty-fourth aspect which is the method of the twenty-third aspect wherein the maximum temperature is from about 230° C. to about 540° C.

A twenty-fifth aspect which is the method of any of the twenty-third through twenty-fourth aspects wherein heating the chromium-based catalyst at the maximum temperature is in an activator.

A twenty-sixth aspect which is the method of any of the twenty-second through twenty-fifth aspects wherein the contacting of the first amount of the monomer with the chromium-based catalyst is in a first reactor, and wherein the contacting of the first reaction mixture with the comonomer and the second amount of the monomer is in a second reactor different from the first reactor.

A twenty-seventh aspect which is the method of the twenty-sixth aspect, further comprising transferring the first reaction mixture from the first reactor into the second reactor, prior to contacting the first reaction mixture with the comonomer and the second amount of the monomer at the second temperature.

A twenty-eighth aspect which is the method of any of the twenty-sixth through twenty-seventh aspects wherein the first reactor and/or the second reactor are slurry loop reactors.

A twenty-ninth aspect which is the method of any of the twenty-sixth through twenty-eighth aspects wherein the first reactor and the second reactor are operated in series or parallel configurations.

A thirtieth aspect which is the method of any of the twenty-sixth through twenty-ninth aspects, wherein a volume of the first reactor is about 0.5 to 1.5 times of a volume of the second reactor.

A thirty-first aspect which is the method of any of the twenty-sixth through thirtieth aspects wherein an average residence time of the first reactor is from about 30 minutes to about 120 minutes.

A thirty-second aspect which is the method of any of the twenty-sixth through thirty-first aspects wherein an average residence time of the second reactor is from about 45 minutes to about 90 minutes.

A thirty-third aspect which is the method of any of the twenty-second through thirty-second aspects wherein the first temperature is from about 70° C. to about 110° C.

A thirty-fourth aspect which is the method of any of the twenty-second through thirty-third aspects wherein contacting the first amount of the monomer with the chromium-based catalyst at the first temperature is at a pressure of from about 350 psig to about 750 psig.

A thirty-fifth aspect which is the method of any of the twenty-second through thirty-fourth aspects wherein the first amount of the monomer is from about 0.5 mol % to about 10 mol % based on total moles of the first reaction mixture.

A thirty-sixth aspect which is the method of any of the twenty-second through thirty-fifth aspects wherein a comonomer is present in the first reaction mixture in an amount of less than about 0.5 mol % based on total moles of the first reaction mixture.

A thirty-seventh aspect which is the method of any of the twenty-second through thirty-sixth aspects wherein the contacting of the first amount of the monomer with the chromium-based catalyst excludes contacting the first amount of the monomer with a comonomer.

A thirty-eighth aspect which is the method of any of the twenty-second through thirty-seventh aspects further comprising contacting the first amount of the monomer and the chromium-based catalyst with hydrogen prior to forming the lower molecular weight homopolymer in the first reaction mixture.

A thirty-ninth aspect which is the method of the thirty-eighth aspect wherein the hydrogen present in the first reaction mixture is in a concentration of from about 0.01 mol % to about 2 mol %, based on total moles of the first reaction mixture.

A fortieth aspect which is the method of any of the twenty-second through thirty-ninth aspects wherein the chromium-based catalyst comprises chromium catalysts, chromium oxide catalysts, chromium-titanium catalysts or combinations thereof.

A forty-first aspect which is the method of any of the twenty-second through fortieth aspects wherein the chromium-based catalyst is in an amount of from about 0.001 wt. % to about 0.1 wt. % based on a total weight of the first reaction mixture.

A forty-second aspect which is the method of any of the twenty-second through forty-first aspects wherein the second temperature is from about 70° C. to about 110° C.

A forty-third aspect which is the method of any of the twenty-second through forty-second aspects wherein contacting the first reaction mixture with the comonomer and the second amount of the monomer at the second temperature is at a pressure of from about 350 psig to about 75 psig.

A forty-fourth aspect which is the method of any of the twenty-second through forty-third aspects wherein the second amount of the monomer is from about 1 mol % to about 10 mol % based on total moles of the second reaction mixture.

A forty-fifth aspect which is the method of any of the twenty-second through forty-fourth aspects further comprising contacting the first reaction mixture, the comonomer, and the second amount of the monomer with hydrogen at the second temperature to form the second reaction mixture, prior to forming the higher molecular weight copolymer in the second reaction mixture.

A forty-sixth aspect which is the method the forty-fifth aspect wherein the hydrogen in the second reaction mixture is in a concentration of from about 0 mol % to about 1.5 mol based on total moles of the second reaction mixture.

A forty-seventh aspect which is the method of any of the twenty-second through forty-sixth aspects wherein a molar ratio of the comonomer to the second amount of the monomer present in the second reaction mixture is from about 0.1 to about 5.

A forty-eighth aspect which is the method of any of the twenty-second through forty-seventh aspects wherein an amount of the comonomer present in the second reaction mixture is from about 0.1 mol % to about 5 mol % based on total moles of the second reaction mixture.

A forty-ninth aspect which is a method of making a polymer composition, comprising: contacting a first amount of a monomer with a chromium-based catalyst at a first temperature to form a first reaction mixture comprising a lower molecular weight homopolymer; and contacting the first reaction mixture with a comonomer and a second amount of the monomer at a second temperature to form a second reaction mixture comprising a higher molecular weight copolymer, wherein the second temperature is lower than the first temperature, wherein the lower molecular weight homopolymer and the higher molecular weight copolymer form the polymer composition, wherein a number of short chain branches present in the lower molecular weight homopolymer is less than a number of short chain branches present in the higher molecular weight copolymer, and wherein the polymer composition has an ESCR of from about 25 hours to about 300 hours when measured in accordance with ASTM D1693 or ASTM D2561.

A fiftieth aspect which is a method of making a polymer composition, comprising: contacting a first amount of a monomer with a chromium-based catalyst at a first temperature to form a first reaction mixture comprising a lower molecular weight homopolymer in a first reactor; transferring the first reaction mixture from the first reactor into another reactor; and contacting the first reaction mixture with a comonomer and a second amount of the monomer at a second temperature to form a second reaction mixture comprising a higher molecular weight copolymer, wherein the second temperature is lower than the first temperature, wherein the lower molecular weight homopolymer and the higher molecular weight copolymer form the polymer composition, wherein a number of short chain branches present in the lower molecular weight homopolymer is less than a number of short chain branches present in the higher molecular weight copolymer, and wherein the polymer composition has an ESCR of from about 25 hours to about 300 hours when measured in accordance with ASTM D1693 or ASTM D2561.

A fifty-first aspect which is a blow molded article prepared from the polymer composition of claim 1.

A fifty-second aspect which is a method of making a blow molded article comprising: blow molding the polymer composition of claim 1.

While aspects of the disclosure have been shown and described, modifications thereof can be made without departing from the spirit and teachings of the disclosed subject matter. The aspects and examples described herein are exemplary only, and are not intended to be limiting. Many variations and modifications of the subject matter disclosed herein are possible and are within the scope of the disclosed subject matter.

At least one aspect is disclosed and variations, combinations, and/or modifications of the aspect(s) and/or features of the aspect(s) made by a person having ordinary skill in the art are within the scope of the disclosure. Alternative aspects that result from combining, integrating, and/or omitting features of the aspect(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the detailed description of the presently disclosed subject matter.

What is claimed is:

1. A chromium-catalyzed bimodal polymer composition comprising a lower molecular weight (LMW) homopolymer and a higher molecular weight (HMW) copolymer wherein the bimodal polymer composition has a density of from about 0.930 gram per cubic centimeter (g/cc) to about 0.970 g/cc, a ratio of high load melt index:melt index of from about 10 to about 150, an Environmental Stress Crack Resistance (ESCR) of from about 25 hours to about 300 hours when measured in accordance with ASTM D1693 or ASTM D2561, a z-average molecular weight ($M_z$) of from about 650,000 g/mol to about 3,500,000 g/mol and a primary structure parameter (PSP2) of from about 6.0 to about 13.

2. The polymer composition of claim 1, wherein a weight ratio of the lower molecular weight homopolymer to the higher molecular weight copolymer present in the polymer composition is from about 35:65 to about 65:35.

3. The polymer composition of claim 1, wherein a number of short chain branches present in the lower molecular weight homopolymer is from about 0 per 1000 total carbon atoms to less than about 2 per 1000 total carbon atoms.

4. The polymer composition of claim 1, wherein the lower molecular weight homopolymer has a weight average molecular weight of from about 50,000 g/mol to about 250,000 g/mol.

5. The polymer composition of claim 1, wherein a number of short chain branches present in the higher molecular weight copolymer is in a range of from about 0.5 per 1000 total carbon atoms to about 10 per 1000 total carbon atoms.

6. The polymer composition of claim 1, wherein the higher molecular weight copolymer has a weight average molecular weight of from about 135,000 g/mol to about 350,000 g/mol.

7. The polymer composition of claim 2, wherein a monomer of the lower molecular weight homopolymer comprises ethylene, propylene, butene, 1-pentene, 1-hexene, 1-octene, 1-decene, or combinations thereof.

8. The polymer composition of claim 1, wherein a comonomer of the higher molecular weight copolymer comprises unsaturated hydrocarbons with 3 to 12 carbon atoms.

9. The polymer composition of claim 1, wherein a comonomer of the higher molecular weight copolymer comprises an alpha-alkene or a derivative of an alpha-alkene.

10. The polymer composition of claim 9, wherein a comonomer of the higher molecular weight copolymer comprises 1-hexene.

11. The polymer composition of claim 1, having a density of from about 0.938 g/cc to about 0.965 g/cc.

12. The polymer composition of claim 1, having a Melt Index (MI) of from about 0.01 grams per 10 minutes (g/10 min) to about 1.0 g/10 min at a temperature of 190° C. and a weight of 2.16 kg, when measured in accordance with ASTM D1238-82 condition E.

13. The polymer composition of claim 1, having a High Load Melt Index (HLMI) of from about 1 g/10 min to about 100 g/10 min at a temperature of 190° C. and a weight of 21.6 kg, when measured in accordance with ASTM D1238-82 condition F.

14. The polymer composition of claim 1, having an I10 of from about 0.01 g/10 min to about 10 g/10 min when subjected to a force of 10,000 grams at 190° C. as determined in accordance with ASTM D1238-82 condition N.

15. The polymer composition of claim 1, having a number average molecular weight ($M_n$) of from about 10,000 g/mol to about 50,000 g/mol.

16. The polymer composition of claim 1, having a weight average molecular weight ($M_w$) of from about 100,000 g/mol to about 300,000 g/mol.

17. The polymer composition of claim 1, wherein the HMW component has a z-average molecular weight (Mz) of from about 500,000 g/mol to about 5,000,000 g/mol.

18. The polymer composition of claim 1, having a polydispersity index (PDI) of from about 6 to about 30.

19. The polymer composition of claim 1, having an ESCR-A value of from about 25 hours to about 4500 hours as measured in accordance with ASTM D1693.

20. The polymer composition of claim 1, having a weight swell of less than about 700.

21. A chromium-catalyzed polymer composition comprising (i) a lower molecular weight homopolymer and (ii) a higher molecular weight copolymer, wherein the bimodal polymer composition has an Environmental Stress Crack Resistance (ESCR) of from about 25 hours to about 300 hours when measured in accordance with ASTM D1693 or ASTM D2561 a z-average molecular weight ($M_z$) of from about 650,000 g/mol to about 3,500,000 g/mol and a primary structure parameter (PSP2) of from about 6.0 to about 13.

22. A bimodal polymer composition comprising a high molecular weight (HMW) component and a low molecular weight (LMW) component, wherein a ratio of a $M_w$ of the BMW component to a $M_w$ of the LMW component is from greater than about 1 to about 7, a ratio of a $M_p$ of the BMW component to a $M_p$ of the LMW component is from greater than about 1 to about 40, the polymer composition has a z-average molecular weight ($M_z$) of from about 650,000 g/mol to about 3,500,000 g/mol and a primary structure parameter (PSP2) of from about 6.0 to about 13.

* * * * *